2,927,894

NOVEL COMPOSITION OF IMPROVED LUBRICATING PROPERTIES COMPRISING A FLUOROCHLORO POLYMER

Dickson E. Neunherz, Columbus, Ohio, assignor, by mesne assignments, to Minnesota Mining and Manufacturing Company, St. Paul, Minn., a corporation of Delaware No Drawing. Application September 20, 1955
Serial No. 535,508

2 Claims. (Cl. 252—54.6)

This invention relates to a novel composition of matter having improved lubricating properties, and to a method for the preparation thereof. In one aspect this invention relates to a novel normally liquid lubricating composition having improved properties. In another aspect this invention relates to a novel grease composition having improved lubricating properties.

A variety of oils and greases which are useful as lubricants are commercially available today. These compositions are satisfactory in many applications, but where chemical stability, for example, is required they usually prove inadequate. Many of the presently available lubricating compositions are also relatively useless as high pressure lubricants and at elevated temperatures due to their lack of sufficient load-carrying capacity and due to their inflammable nature. Thus such compositions are unsuitable as lubricants in applications involving a high rubbing speed between lubricated surfaces and are particularly unsuitable as lubricants between ferrous surfaces such as steel on steel. In addition to these properties many of the presently available materials having oil and grease characteristics possess other undesirable properties which limit their application as lubricants. For example, many possess a relatively high change in viscosity with temperature especially over a wide range of temperatures, corrosively attack natural and synthetic rubbers, tend to solidify at low temperatures, and have poor film strength. In addition many of the presently available grease compositions gradually break down under conditions where high shearing stresses are involved.

It is an object of the present invention to provide a novel composition having improved lubricating properties.

Another object is to provide a novel lubricating composition having improved lubricity properties such as load carrying capacity and which is chemically stable.

Another object is to provide a novel composition having improved lubricity properties and which is suitable for use in corrosive atmospheres and under extreme temperature conditions.

A further object is to provide a relatively non-flammable lubricating composition having improved properties.

A further object is to provide a novel lubricating composition having a relatively uniform viscosity over a relatively wide range of temperatures and good load-carrying properties.

A still further object is to provide a normally liquid lubricating composition which is chemically and physically superior to currently available compositions and to provide a process for the preparation of such a composition.

A still further object is to provide a novel grease composition having improved lubricating properties and which is chemically and physically superior to currently available compositions and to provide a process for the preparation of such a composition.

Further objects and advantages of the present invention will become apparent to those skilled in the art from the accompanying description and disclosure.

Accordingly, these objects are accomplished by the process which comprises admixing a low molecular weight polymer of a perfluorochloroolefin with a normally liquid synthetic ester of an organic carboxylic acid having typical oily characteristics. Of the low molecular weight polymers of a perfluorochloroolefin which may be employed as one component of the composition of the present invention, the telomer products of a perfluorochloroethylene having halogen-containing terminal groups are used to best advantage. Of the normally liquid synthetic esters which may be employed as a second component of the novel compositions herein described, the normally liquid aliphatic dicarboxylic acid esters are preferred, and the branched chain aliphatic diesters are particularly preferred. The novel compositions of the present invention have particularly good lubricity properties such as a high load-carrying capacity as evidenced by their high Point B values, and are particularly useful as extreme pressure lubricants, and in an environment subject to exposure to strong and corrosive chemicals and fuels and to relatively extreme conditions of temperature, that is, at temperatures between about −55° C. and about +200° C.

The low molecular weight polymer of a perfluorochloroethylene employed as one component in the composition of this invention is prepared by telomerization of perfluorochloroethylenes such as trifluorochloroethylene and difluorodichloroethylene to produce oils, greases and waxes. Also useful are cotelomers of the above perfluorochloroethylenes prepared by cotelomerization with each other and with hydrogen-containing halogenated olefins such as vinyl fluoride, vinylidene fluoride, vinyl chloride and vinylidene chloride. The particularly preferred telomers are those which are prepared by the homotelomerization of trifluorochloroethylene in the presence of a sulfuryl halide, such telomers having an even number of carbon atoms and a halogen terminal group.

As used herein the term "telomer" includes homotelomers and cotelomers, and the term "telomerization" includes homotelomerization and cotelomerization, and by the term "low molecular polymer" is meant a polymer having a molecular weight not higher than 10,000.

The preparation of the above-mentioned preferred class of low molecular weight polymers of perfluorochloroethylenes which is used as one component of the compositions described herein is accomplished by telomerizing the perfluorochloroethylene in the presence of a sulfuryl halide and a catalyst such as benzoyl peroxide which is usually dissolved in an inert solvent at a temperature between about 75° C. and about 210° C. The telomerization may be effected in the presence or absence of sulfur dioxide as desired. The homotelomers of trifluorochloroethylene thereby produced have the general formula $Y_1-(CF_2-CFCl)_n-Y_2$ wherein $Y_1$ and $Y_2$ are members selected from the group consisting of fluorine, chlorine, and bromine and may be the same or different, and $n$ is an integer of at least one, preferably of at least 4 and is not more than 20. The telomers may be separated by conventional distillation. The distillable substances obtained by telomerization of trifluorochloroethylene in the presence of sulfuryl chloride, for example, are sufficiently stable so as not to absorb appreciable amounts of fluorine even though exposed to the gas for 24 hours at a temperature of 60° C. or so as not to significantly pyrolytically decompose at temperatures up to 200° C.

For purposes of clarity a specific example of the telomerization of the preferred monomer, trifluorochloroethylene is presented below.

EXAMPLE 1

A pressure system was flushed out with nitrogen and charged with a peroxide solution (3.5 parts of benzoyl peroxide dissolved in 38 parts of carbon tetrachloride) and 135 parts of sulfuryl chloride. This system was cooled to about −25° C. or below and 116 parts of trifluorochloroethylene was added. The system was closed and heated to about 95° C. for a period of 4 hours during which time the mixture was mechanically agitated. A maximum gage pressure of 300 pounds per square inch was reached and then gradually subsided. At the end of the telomerization, the gases were bled from the system and the liquid product was transferred to a distilling pot and the carbon tetrachloride solvent was boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 1 mm. mercury pressure and at a vapor temperature up to 230° C. The telomer yield was 78% with 93% of the product distilled. The telomer products prepared by the above-described process have an even number of carbon atoms in the chain and halogen terminal groups. Since sulfuryl chloride is usually employed as the telogen, the halogen terminal groups will usually be chorine. Other telogens which may be employed are sulfuryl fluoride, sulfuryl bromide, and fluorosulfuryl chloride.

Table I below describes the physical properties of the trifluorochloroethylene telomeric fractions which are preferred as one component of the presently described compositions. The particular fractions referred to in the table are normally liquid oils, greases and waxes which were prepared by the telomerization process above described. The telomer product is usually distilled into the fractions such as are listed in Table I. However, narrower (e.g. the trimer, tetramer, pentamer, etc., and mixtures thereof) or broader cuts can be made if desired. The molecular weights are approximate or average for each fraction. Actually the molecular weight of the telomers of trifluorochloroethylene ranges between about 300 and 2300. Fractions 2 and 3 of Table I are normally liquid oils having between about 4 and 20 carbon atoms, and are the particularly preferred telomer products used as one component of the presently described novel compositions, especially in the compositions which are to be used as extreme pressure lubricants and particularly as anti-seize lubricants between ferrous surfaces where good load-carrying properties are necessary.

*Table I*

PHYSICAL PROPERTIES OF TRIFLUOROCHLOROETHYLENE-SULFURYL CHLORIDE TELEOMER PRODUCTS $Cl(CF_2CFCl)_nCl$

| Fraction | 1 | 2 | 3 | 4 |
| --- | --- | --- | --- | --- |
| Molecular Weight | 500 | 630 | 780 | 940 |
| Boiling Range, °C., at 1 mm. Hg | up to 95 | 95–132 | 132–208 | 208–245 |
| Viscosity, Centistokes: | | | | |
| 100° F | 3 | 25 | 220 | |
| 210° F | | 3.08 | 10 | 40 |
| Viscosity, Centipoises: | | | | |
| 100° F | 5.6 | 47 | 425 | |
| 210° F | | 5 | 18 | 75 |
| Pour Point, °F | <−70 | −45 | +30 | +90 |
| Specific Gravity: | | | | |
| 68° F./39° F | 1.86 | 1.93 | 1.96 | |
| 160° F./39° F | | 1.85 | 1.88 | 1.92 |
| Refractive Index, $n_D$: | | | | |
| 77° F | 1.401 | 1.405 | 1.410 | |
| 160° F | | | | 1.398 |

Other low molecular weight polymers of trifluorochloroethylene which may be employed are those obtained by the thermal cracking of high molecular weight polytrifluorochloroethylene thermoplastic and by a controlled polymerization of trifluorochloroethylene. The processes which may be employed to obtain such low molecular weight polymers of trifluorochloroethylene are those described in U.S. Patent 2,636,908, issued April 28, 1953, to A. L. Dittman and J. M. Wrightson, and in U.S. Patent 2,636,907, issued April 28, 1953, to W. T. Miller. It should be noted, however, that there are significant differences between the polymeric trifluorochloroethylene products produced by these processes and those produced by telomerization. For example, polymers produced by the thermal cracking process or by controlled polymerization to produce low molecular weight material have a random number of carbon atoms and no single identifiable species. The end group in the cracked polymers are unknown but are believed to be fluorine. Cracked polymer also has a higher fluorine content and a lower chlorine content than telomer. The low molecular weight polymers of trifluorochloroethylene produced by polymerization with sulfuryl chloride have better characteristics as ingredients in the compositions of the present invention than the polymers of trifluorochloroethylene produced by other techniques and their use is therefore preferred.

The synthetic esters which are used to best advantage as a second component of the lubricating compositions of the present invention are the normally liquid aliphatic diesters of organic dicarboxylic acids, the diester preferably having between about 14 and 36 carbon atoms per molecule. The organic acids from which the esters are derived are preferably the dicarboxylic acids having between about 6 and 12 carbon atoms per molecule and include both aliphatic and aromatic dicarboxylic acids. Of the aliphatic diacids which are employed the saturated acids are preferred and are typically exemplified by adipic, suberic, azelaic and sebacic acids. Phthalic acid is the preferred aromatic acid. The organic alcohols which are reacted with the organic dicarboxylic acids to produce the diesters used in accordance with the present invention are preferably the relatively high molecular weight alcohols, i.e. those alcohols having between 4 and 12 carbon atoms per molecule. A particularly preferred group of esters are the diesters of aliphatic dicarboxylic acids wherein each alcohol radical contains a branched chain alkyl radical having between about 4 and 12 carbon atoms, and wherein the dicarboxylic acid radical contains from 6 to 12 carbon atoms. The use of this latter group of diesters as a component in the composition of the present invention yields lubricating compositions having unexpectedly improved load-carrying properties and are especially useful as extreme pressure lubricants between rubbing ferrous surfaces.

Typical examples of the synthetic normally liquid diesters which are used as a component in accordance with the present invention are di-nonyl glutarate, di-3-methylheptyl adipate, di-1-methylheptyl adipate, di-2-ethylhexyl adipate, di-isooctyl adipate, di-2-ethylhexyl sebacate, di-sec-amyl sebacate, diisooctyl sebacate, di-propargyl sebacate, di-2-ethoxyethyl sebacate, di-2-(2′-methoxyethoxy) ethyl sebacate, dioctyl phthalate, dimethyl cyclohexyl phthalate and any mixture thereof.

Other synthetic ester lubricants which may be employed as a second component of the present invention are the normally liquid monoesters obtained by esterification of organic monocarboxylic acids such as pelargonic acid with the above-mentioned alcohols, which monoesters are typically exemplified by 2-ethylhexyl pelargonate. Also included within the scope of the present invention is the use of esters derived from acetylenically unsaturated alcohols and one of the above-mentioned organic carboxylic acids.

The physical nature of the compositions of the present invention varies from relatively thin or light liquids of low viscosity to more viscous and heavier liquids and grease compositions. The concentration of the low molecular weight perhalogenated polymer component as compared to the concentration of the liquid ester component may vary over relatively wide limits. Generally speaking, the particular concentration of components which is employed will depend upon the nature and properties of each component and on the desired characteristics of the composition. The compositions of this invention are made by admixing the telomer of trifluorochloroethylene, for example, and the diester together under conditions which insure thorough commingling of each component. In general the weight ratio of the low molecular weight perhalogenated polymer to diester is between about 0.01:1 and about 0.4:1. The use of more than about 35 weight percent of the perfluorochloro polymeric component in the presently described compositions does not appreciably improve the load-carrying properties of the resultant compositions, although the use of higher concentrations may improve other properties of the lubricating composition. The preferred weight ratio of the low molecular weight perfluorochloro polymer component to ester component is between about 0.03:1 and about 0.2:1, particularly when the telomers of trifluorochloroethylene having a viscosity at 210° F. of between about 3 and about 40 centistokes are employed. These latter compositions have particularly good lubricity properties as evidenced by their Point B values and are particularly good lubricants for steel sliding on steel.

It is within the scope of the present invention to add as a third component a thickening or gelling agent in order to obtain grease compositions which find particular usefulness as extreme pressure lubricants between rubbing ferrous surfaces. The thickeners which may be employed comprise metal salts of organic carboxylic acids, and preferably the metal salts of organic perfluorochlorocarboxylic acids, siliceous materials such as the bentonites and estersils, and aryl substituted ureas.

The perfluorochlorocarboxylic acids which are used to produce the salts which may be used as gelling agents in accordance with this invention are prepared from fluorochlorocarbon oils which are generally similar to those described above. They may be prepared, for example, by the potassium permanganate oxidation of a thermally cracked trifluorochloroethylene polymer. Such acids also may be prepared by hydrolysis with fuming sulfuric acid of the above-mentioned telomers of trifluorochloroethylene. The mixed telomer or any fraction thereof is treated with fuming sulfuric acid containing from 0 to 20 percent sulfur trioxide at a temperature between about 140° C. to about 210° C. for a period of time ranging between about 5 and about 25 hours to produce monocarboxylic acids having the formula $Cl(CF_2CFCl)_{n-1}CF_2COOH$ wherein $n$ is as above-defined. Salts are prepared from these acids by replacement of the hydrogen ions of the acids by the desired metal ions. The sodium, calcium, aluminum and cadmium salts of these organic perfluorochlorocarboxylic acids represent a preferred class of gelling agents which may be used in the preparation of the grease compositions of the present invention. Typical examples of this class of gelling agent are the calcium and aluminum salts of 3,5,7,8-tetrachloroundecafluorooctanoic acid, and the sodium and calcium salts of 3,5,7,9,10-pentachloroperfluorodecanoic acid.

The siliceous materials which also may be used in preparing the novel grease compositions of this invention are the various oxides of silicon and derivatives thereof. The oxides of silicon are available commercially under the designation Silene (calcium silicate), Hi-Sil (hydrated silica), Calcene (calcium silicate), and Syloid (essentially pure silica). These are finely divided siliceous compounds. Other derivatives of silica which are employed, are hydrous alumina silicate, hydrous magnesium silicate, and various natural occurring siliceous clays such as attapulgite, and bentonite. Particularly suitable siliceous materials are the quaternary ammonium derivatives of the silicates or bentonites. Examples of such quaternary ammonium bentonites are decyl ammonium bentonite, dimethyl dioctadecyl ammonium bentonite which is commercially available as Bentone 34, and dioctadecyl ammonium bentonite. Bentone 34 is the preferred quaternary ammonium bentonite.

Another preferred type of siliceous material which may be employed as a gelling agent in accordance with the present invention are the estersils which are prepared by reacting an alcohol with silica. The alcohols with which the silica is esterified are the alphatic alcohols having between 2 and 18 carbon atoms and preferably between 3 and 12 carbon atoms and are, for example, ethyl, n-propyl, n-butyl, n-hexyl, n-dodecyl and isobutyl alcohols as well as cyclopentanol, and cyclo hexanol. The quantity of the aliphatic radicals (i.e. the organophilic surface) on the surface of the estersil should be sufficient to provide a layer, usually monomolecular, on at least 25 percent of the surface of the silica and preferably on at least 50 percent of the surface.

The preparation of the grease compositions of the present invention is effected by admixing with, and intimately dispersing within the selected telomer fraction, a minor proportion of the gelling agent. The exact quantity of the gelling agent that is admixed with the telomer and ester fluids will depend upon the desired characteristics of the grease. Generally, however, the concentration of the gelling agent will be between about 1 and about 25 weight percent based on the combined total weight of the low molecular weight polymer of the perfluorochloroolefin and ester fluid, the preferred concentration ranging between about 2 and about 15 weight percent. The consistency of the grease is also controlled by the proper selection of a particular telomer fraction. Low molecular weight telomers are available as light to heavy oils, light to heavy greases and soft to hard waxes. By selection of a particular fraction of telomer, or by blending various concentrations of gelling agent, greases varying from light to relatively mobile gels to hard greases are obtained. Generally less of the thickener is used with the higher molecular weight telomers (i.e. greases and waxes) than with the lower molecular weight telomers (i.e. oils). The selection of the particular composition is determined by the particular end use of the grease. Thus where heavy duty lubricants are required, higher concentrations of thickener and higher viscosity telomers are used.

Various additives may be incorporated within the low molecular weight perfluorochloro polymeric-synthetic ester admixtures of the present invention in addition to the gelling agent to improve various characteristics of the end product. For example, surface active agents also may be added to improve, for example, the adhesion characteristics of the grease compositions of the present invention. These surface active agents are organic amines which are prepared by reacting ammonia or a low molecular weight amine with epichlorohydrin or with neutral esters of a metaphosphoric acid. These surface active agents are commercially available under the trade name "Vitamine." The surface active agents when used are employed in concentrations not exceeding about 5 weight percent based on the total weight of the composition. Other materials which may be added to the compositions of the present invention are molybdenum disulfide, graphite, metal sulfonates, etc.

The following examples are offered as a better understanding of the present invention and are not to be construed as unnecessarily limiting thereto. The Point B values given in the following examples were determined in a Shell four-ball extreme-pressure lubricant tester. The Shell four-ball tester consists essentially of three contacting balls (usually steel) held in a fixed position relative to each other and a fourth ball above and in contact with the other three. The fourth ball is pressed against three stationary balls with an adjustable force and rotated at constant speed. The points of contact are lubricated by oil in a cup surrounding the four-ball assembly. During a test, circular scars are worn in the surface of the three stationary balls. The diameter of the scars, which is a measure of wear, depends on the load, speed, time of test, and character of the lubricant.

The Point B value which indicates the load-carrying capacity of a lubricating composition represents the maximum load in kilograms before which metal-to-metal contact or seizure occurs. The Point B values given in the following examples were based on one minute applications of the Shell four-ball tester.

EXAMPLES 2–4

These examples illustrate the preparation of the novel liquid lubricating compositions of the present invention. The sulfuryl chloride-trifluorochloroethylene telomer employed in these examples was that designated as fraction 2 of the above Table I (boiling point 95°–132° C. at 1 mm. Hg. pressure, viscosity at 100° C. of 3.08 centistokes). The synthetic diester oil employed was di-(2-ethylhexyl) sebacate which is sold by the Rohm & Haas Company under the trade designation "Plexol 201." The exact proportions of telomer which were added to the diester oil are indicated in Examples 3 and 4 of the following Table II. The telomer oil and diester were blended at room temperature with mechanical agitation until a homogeneous admixture was obtained. For comparison purposes no telomer was added to the di-(2-ethylhexyl) sebacate in Example 2. The details of the results obtained in these examples are given in Table II, that is, the Point B values, and the viscosity of the admixtures at 100° F. and 210° F. from which the viscosity coefficient was calculated. The Point B value of the sulfuryl chloride telomer of trifluorochloroethylene employed in these examples is 10 kilograms for a one minute application of the Shell four-ball tester.

Table II

VISCOSITY AND LOAD CARRYING PROPERTIES OF TRIFLUOROCHLOROETHYLENE-SULFURYL CHLORIDE TELOMER [1] AND DI-(2-ETHYLHEXYL) SEBACATE

| Example | Weight Percent of Telomer | Point B, Kilograms | Viscosity centistokes | | V.T.C.[2] |
|---|---|---|---|---|---|
| | | | 100° F. | 210° F. | |
| 2 | 0 | 40 | 12.51 | 3.32 | 0.735 |
| 3 | 1 | 45 | | | |
| 4 | 5 | 50 | 12.48 | 3.21 | 0.74 |

[1] Fraction 2 of Table I; viscosity at 210° F. = 3.08 centistokes.

[2] Viscosity temperature coefficient = $1 - \frac{\text{viscosity at } 210° \text{F.}}{\text{viscosity at } 100° \text{F.}}$ The improved lubricity properties as evidenced by the Point B values of the admixtures of Examples 3 and 4 are unexpectedly good and are considerably higher than the Point B values of either the telomer or diester alone. The lubricating compositions of Examples 3 and 4 are liquid lubricants and are particularly useful as components of jet aircraft oils and greases suitable for lubrication of instruments, control bearings, motors and the like.

EXAMPLE 5

This example illustrates the preparation of a grease composition comprising an admixture of telomer and a liquid synthetic diester.

To an admixture containing 20 grams of the sulfuryl chloride-trifluorochloroethylene telomer designated as fraction 3 of Table I and prepared as described in Example 1 above, there are added 70 grams of di-(2-ethylhexyl) sebacate, and 10 grams of the butylated estersil (Estersil-GT) as the thickening agent. The admixture is mechanically agitated at about 50° C. until a homogeneous blend is obtained. The resultant grease composition has good lubricity properties and is useful as an aircraft turbine lubricant.

Other novel liquid and grease lubricating compositions having particularly improved lubricity properties are similarly prepared as described in the above examples by admixing the various fractions of the sulfuryl chloride telomers of trifluorochloroethylene listed in Table I above with other synthetic ester fluids such as di-(2-ethylhexyl) adipate, di-sec-amyl adipate, di-3-methylheptyl adipate and dimethyl cyclohexyl adipate.

It has been found that the admixture of the low molecular weight telomers of trifluorochloroethylene with other synthetic lubricating oils does not always produce a lubricating composition having improved load-carrying properties. For example, the addition of 5 percent of the sulfuryl chloride-trifluorochloroethylene telomer oil designated as fraction 2 of Table I of the oil soluble polyalkylene glycol sold by Carbide and Carbon Chemicals, New York, under the trade designation Ucon LB–285 was found to have a Point B value of 45 kilograms which was the same as the Point B value of the pure Ucon LB–285 lubricant. Just why the low molecular polymers of a perfluorochloroethylene such as the $Cl(CF_2-CFCl)_nCl$ telomers exert a beneficial effect on the load-carrying properties of the synthetic ester fluids used in accordance with the present invention, and not on another synthetic lubricant such as the polyalkylene glycols is not understood or clear.

As is apparent the present invention relates to novel compositions which comprise an admixture of a low molecular weight polymer of perfluoroolefin and a synthetic ester having typical oily characteristics. The preferred components are the low molecular sulfuryl chloride telomers of trifluorochloroethylene having a plurality of trifluorochloroethylene monomer units and chlorine terminal groups and the diesters of aliphatic dicarboxylic acids wherein each alcohol contains a branched chain alkyl radical having between about 4 and 12 carbon atoms. The novel compositions of the present invention including the normally liquid and grease compositions have particularly improved load-carrying properties than either of the individual components alone. Other alterations and modifications of the compositions of the present invention and the method of preparing such compositions may become apparent to those skilled in the art without departing from the scope of the present invention.

I claim:

1. A novel lubricant composition of high load-carrying capacity consisting essentially of an admixture of a liquid open chain telomer of trifluorochloroethylene having between about 4 and 20 carbon atoms and containing a plurality of trifluorochloroethylene monomer units and chlorine terminal groups, and a diester of an aliphatic dicarboxylic acid wherein each alcohol radical contains a branched chain alkyl radical having between about 4 and 12 carbon atoms and wherein the dicarboxylic acid radical contains from 6 to 12 carbon atoms, said telomer constituting up to about 5 weight percent of said admixture.

2. A novel lubricant composition of high load-carrying capacity consisting essentially of an admixture of di-(2-ethylhexyl) sebacate and a liquid open chain telomer of trifluorochloroethylene having between about 4 and 20 carbon atoms and containing a plurality of trifluorochloroethylene monomer units and chlorine terminal groups, said telomer constituting up to about 5 weight percent of said admixture.

References Cited in the file of this patent

UNITED STATES PATENTS

| | | |
|---|---|---|
| 2,623,852 | Peterson | Dec. 30, 1952 |
| 2,636,907 | Miller | Apr. 28, 1953 |
| 2,679,479 | Peterson | May 25, 1954 |
| 2,681,940 | Ruh | June 22, 1954 |
| 2,695,880 | Benning | Nov. 30, 1954 |
| 2,704,363 | Armstrong | Mar. 15, 1955 |
| 2,705,700 | Iler | Apr. 5, 1955 |
| 2,770,659 | Barnhart | Nov. 13, 1956 |